US012335564B2

(12) United States Patent
Ruangchan et al.

(10) Patent No.: US 12,335,564 B2
(45) Date of Patent: Jun. 17, 2025

(54) PARAMETER SELECTION FOR MEDIA PLAYBACK

(71) Applicant: Apple Inc., Cupertino, CA (US)

(72) Inventors: Danvin Ruangchan, San Jose, CA (US); David M. Cole, Aliso Viejo, CA (US); Joshua J. Taylor, Cupertino, CA (US); Christopher T. Eubank, Santa Barbara, CA (US); Samir Gehani, Cupertino, CA (US); Travis W. Brown, Boulder, CO (US); Shai Messingher Lang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 18/368,685

(22) Filed: Sep. 15, 2023

(65) Prior Publication Data

US 2024/0107113 A1  Mar. 28, 2024

Related U.S. Application Data

(60) Provisional application No. 63/409,179, filed on Sep. 22, 2022.

(51) Int. Cl.
| H04N 21/44 | (2011.01) |
| H04N 21/414 | (2011.01) |
| H04N 21/45 | (2011.01) |
| H04N 21/81 | (2011.01) |

(52) U.S. Cl.
CPC . *H04N 21/44008* (2013.01); *H04N 21/41407* (2013.01); *H04N 21/4532* (2013.01); *H04N 21/816* (2013.01)

(58) Field of Classification Search
CPC ....... H04N 21/44008; H04N 21/41407; H04N 21/4532; H04N 21/816
See application file for complete search history.

(56) References Cited

U.S. PATENT DOCUMENTS

| 2011/0161843 | A1* | 6/2011 | Bennett | H04N 21/235 715/760 |
| 2017/0339392 | A1* | 11/2017 | Forutanpour | H04N 13/161 |
| 2023/0188792 | A1* | 6/2023 | Sahasi | H04N 21/4668 725/46 |
| 2025/0030925 | A1* | 1/2025 | DeFaria | H04N 21/43074 |

* cited by examiner

*Primary Examiner* — Thai Q Tran
*Assistant Examiner* — Jose M Mesa
(74) *Attorney, Agent, or Firm* — Thompson Hine LLP (57) ABSTRACT

Various implementations disclosed herein include devices, systems, and methods that provide video content (e.g., a TV show, a recorded sporting event, a movie, a 3D video, etc.) within a 3D environment using parameters selected based on one or more contextual factors. Such contextual factors may be determined based on an attribute of the content (e.g., its intended purpose or viewing environment), the user (e.g., the user's visual quality, interpupillary distance, etc.), the 3D environment (e.g., current lighting conditions, spatial considerations, etc.), or other context attributes.

25 Claims, 8 Drawing Sheets

PARAMETER SELECTION FOR MEDIA PLAYBACK

CROSS-REFERENCE TO RELATED APPLICATIONS

This Application claims the benefit of U.S. Provisional Application Ser. No. 63/409,179 filed Sep. 22, 2022, which is incorporated herein in its entirety.

TECHNICAL FIELD

The present disclosure generally relates to systems, methods, and devices that present media content, such as video content, within a three-dimensional (3D) environment.

BACKGROUND

Electronic devices, such as head mounted devices (HMDs), include applications for viewing movies and other media content. Such devices generally display media content without adequately accounting for the content's intended viewing environment, the user, the environment in which the content will be viewed, and other contextual factors.

SUMMARY

Various implementations disclosed herein include devices, systems, and methods that provide video content (e.g., a TV show, a recorded sporting event, a movie, a 3D video, etc.) within a 3D environment using parameters selected based on one or more contextual factors. Such contextual factors may be determined based on an attribute of the content (e.g., its intended purpose or intended viewing environment), the user (e.g., the user's vision, interpupillary distance, viewing preferences, etc.), the 3D environment (e.g., current lighting conditions, spatial considerations, etc.), or other context attributes.

In some implementations a device has a processor (e.g., one or more processors) that execute instructions stored in a non-transitory computer-readable medium to perform a method. The method determines a context for presenting a video content item within a view of a 3D environment, where the context is determined based on an attribute of the video content item. The context may relate to an intended viewing environment or playback mode for the content (e.g., intended for dark theater/cinema rather than a dim room or bright work environment, intended for HDR playback rather than SDR playback, etc.). The context may relate to attributes of the user and/or 3D environment, e.g., the user's position within a physical environment upon which the 3D environment may be based. The method determines a presentation rule for presenting video content items within views of 3D environments based on the context and determines a parameter (e.g., 3D position, audio mode, brightness, etc.) for presenting the video content item within the view of the 3D environment based on the context and the presentation rule. The method presents the video content item within a view of the 3D environment based on the parameter.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
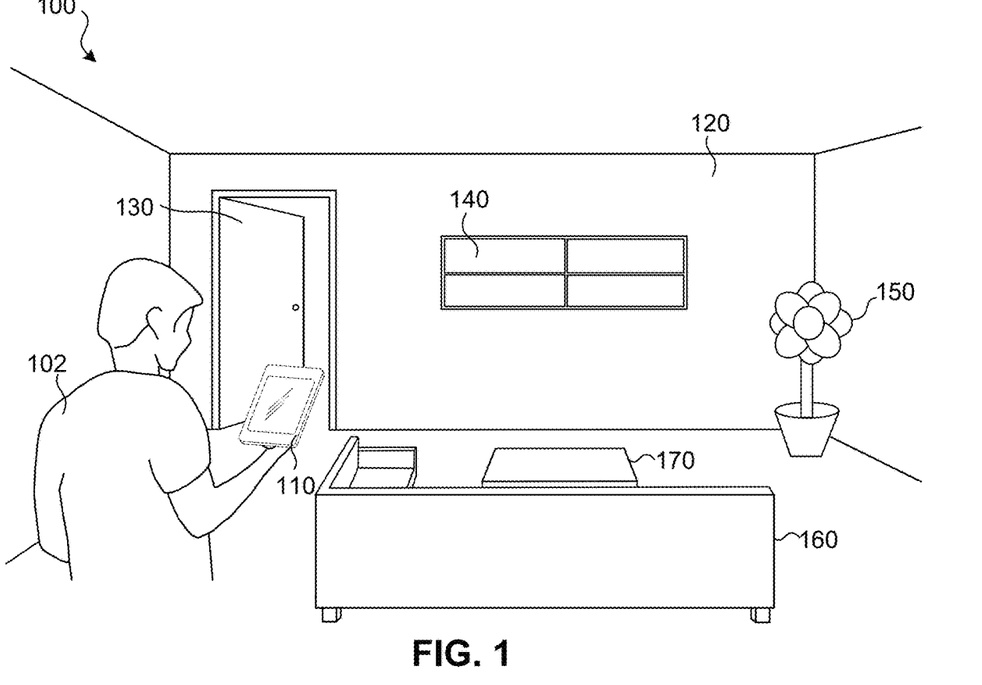
FIG. 1 is an example physical environment in which a device may provide views in accordance with some implementations.

FIG. 1 is a block diagram of an example physical environment 100 in which a device, such as device 110, may provide views in accordance with some implementations. In this example, physical environment 100 includes walls (such as wall 120), a door 130, a window 140, a plant 150, a sofa 160, and a table 170.

The electronic device 110 may include one or more cameras, microphones, depth sensors, or other sensors that can be used to capture information about and evaluate the physical environments 100 and the objects therein, as well as information about the user 102. The device 110 may use information about its physical environment 100 or user 102 that it obtains from its sensors to provide visual and audio content. For example, such information may be used to determine one or more contextual attributes that may be used in configuring parameters of video content and/or depictions of other content within a 3D environment.

In some implementations, the device 110 is configured to present views that it generates to the user 102, including views that may be based on the physical environment 100 and one or more video content items. According to some implementations, the electronic device 110 generates and presents views of an extended reality (XR) environment.

In some implementations, the device 110 is a handheld electronic device (e.g., a smartphone or a tablet). In some implementations, the user 102 wears the device 110 on his/her head. As such, the device 110 may include one or more displays provided to display content. For example, the device 110 may enclose the field-of-view of the user 102.

In some implementations, the functionalities of device 110 are provided by more than one device. In some implementations, the device 110 communicates with a separate controller or server to manage and coordinate an experience for the user. Such a controller or server may be local or remote relative to the physical environment 100.

The device 110 obtains (e.g., by receiving information or making determinations) one or more contextual attributes that it uses to provide views to the user 102. In some implementations, video content can be displayed in different display modes, e.g., small screen mode, large screen mode, cinema/full screen mode, etc., and the context includes the display mode that a user has selected. In some implementations, a user selects a display mode by providing input selecting a display mode. Parameters of a video content item are determined based on contextual attributes associated with the video content item, the user, or the 3D environment in which the video content item will be played. Unlike providing video content flat on a device's screen (e.g., on a television, mobile device, or other traditional electronic device), video content provided within a view of a 3D environment or otherwise on 3D-enabled devices, such as an HMD, can be displayed in innumerable different ways. The parameters that control the display of such video content within a 3D environment on such devices can be desirably or optimally selected based on the contextual factors. For example, one or more of the size of the video content item (e.g., its virtual screen), the position within the environment, the position relative to the viewer, the height, the angle, the brightness, the color format/attributes, the display frame rate, etc. can be determined based on the contextual factors. In some implementations, the display of the surrounding 3D environment is alternatively, or additionally, adjusted based on the context, e.g., changing the brightness or color to better match or compliment the video content.

Using context to determine parameters that control how a video content item or its surrounding 3D environment are presented in a view can provide a higher fidelity or otherwise more desirable user experience than simply providing the video content using default or context-agnostic parameters. Moreover, the context can include information about the intent of the video content item creator, e.g., how the content creator wanted the content to be experienced. Determining the parameters that control how a video content item or its surrounding environment are presented in a view can ensure that the video content item is experienced according to or otherwise based on that intent. For example, a video that is meant to be presented in a dark theater/cinema can be presented in a surrounding environment that is altered to appear dark. In another example, a video that is meant to be presented according to a particular color theme or color interpretation can be presented in an environment that matches or is otherwise consistent with that color theme or color interpretation.

In some implementations, the context relates to the frame rate of the video content item. For example, a context attribute may be that the content item has a 24 frame per second frame rate. This context may be used to adjust the view provided by a device, e.g., by changing the display frame rate to match that of the content or a multiple thereof, e.g., 24 frames per second, 48 frames per second, etc.

In some implementations, the position of a video content item, e.g., on a virtual screen, is determined based on context to optimize or otherwise provide a desirable binocular viewing experience. For example, a 3D movie may be presented at a position relative to the user that is determined to provide a comfortable or desirable experience. Such a position may depend upon the individual user, e.g., the user's vision quality, inter-pupillary distance (IPD), physiological attributes, or viewing preferences, which may individually or collectively provide contextual attributes used to position the video content item relative to the viewer. The position of the video content item may additionally or alternatively account for the resolution of the content or the resolution of the display, e.g., avoiding positions that will provide a pixelated appearance given the resolution of the content or display. Thus, for example, 4K content may be displayed larger than high-definition (HD) content. In some implementations, the position of the content is selected to occupy as large a portion of the displayed view as possible while satisfying user comfort requirements, e.g., not so close that it is uncomfortable to the user. Subjective comfort may be estimated based on average/typical user physiology and preferences or based on user-specific physiology and preferences.

In some implementations, the brightness of a video content item, e.g., on a virtual screen, is determined based on context to optimize or otherwise provide a desirable viewing experience. Brightness parameters may be selected based on the type of content or an intended viewing environment for the content. The content itself may be changed. For example, content intended for a dark environment that is being viewing in a bright environment may be brightened. A video content item may be altered to achieve an intended effect on a user. For example, the video content item may have reduced brightness for a limited period of time and then brightened for a particular scene to provide a beneficial user experience. The user may become accustomed to the lower brightness level and then experience the brightened scene as significantly brighter, without having to actually brighten that scene beyond its original brightness level (which may not be possible given brightness constraints of the device).

In some implementations, a video content item includes metadata that provides contextual attributes, e.g., identifying frame rate, intended viewing environment, content type, color range/format, etc. In some implementations, a video content item is inspected to determine such contextual attributes. Such an inspection may occur locally (e.g., on device 110 in real-time as it prepares to play the video content) or remotely (e.g., on a server separate from device 110 during a prior inspection process).

Figure 2:
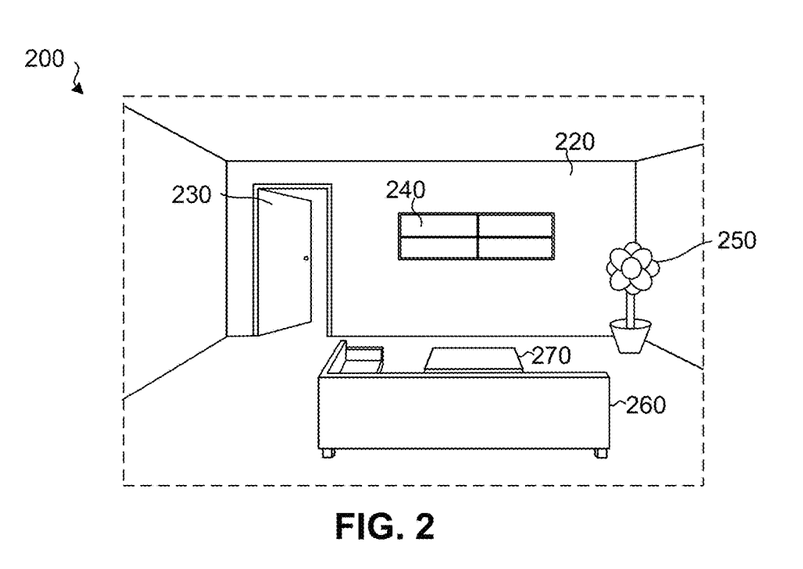
FIG. 2 is a view depicting the physical environment provided by the device of FIG. 1 in accordance with some implementations.

FIG. 2 is a view 200 depicting the physical environment 100 provided by the device 110 of FIG. 1. In this example, the view 200 is a view of an XR environment that depicts and enables user interactions with real or virtual objects. Such a view may include optical see through or pass-through video providing depictions of portions of the physical environment 100. In one example, one or more outward facing cameras on device 110 capture images of the physical environment that are passed through to provide at least some of the content depicted in the view 200. In this example, the view 200 includes depictions of the walls, such as depiction 220 of wall 120, depictions of the floor and ceiling, a depiction 230 of the door 130, a depiction 240 of the window 140, a depiction 250 of the flower 150, a depiction 260 of the sofa 160, and a depiction 270 of the table 170.

Figure 3:
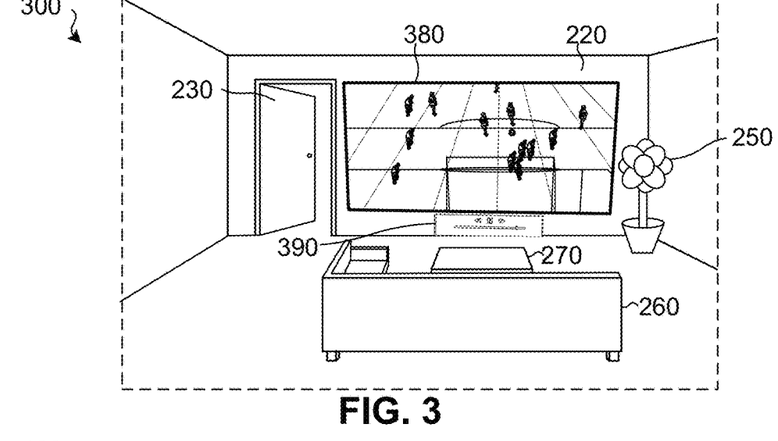
FIG. 3 is a view depicting the physical environment and a video content item using one or more context-based parameters in accordance with some implementations.

FIG. 3 is a view 300 depicting the physical environment 100 and a video content item 380 using one or more context-based parameters in accordance with some implementations. In this example, parameters defining the position, orientation, and other attributes of the video content item 380 and the other depictions 220, 230, 250, 260, 270 are determined based on context. The context may include the video content item having a 4K resolution, the user having selected a large screen display mode, the user having an average/typical IPD, the video content item being intended for a home viewing environment (rather than a theater/cinema), the physical environment upon which the 3D environment is based having spatial dimensions that qualify it as a large room, the positions of potential viewing obstacles within the 3D environment, etc. In this example, based on such context attributes, the device 110 determines to position the video content item 380 one foot in front of wall 220, two feet above the floor, and angled slightly down given the user's height and position. It also determines to give the video content item 380 a size that will provide a comfortable and non-pixelated view given the 4K content and the viewer's position. It also determines to leave the brightness of the video content item 380 unchanged and the brightness of the other depictions 220, 230, 250, 260, 270 unchanged given the intended viewing environment matching the actual 3D environment depicted in the view. In addition, the device 110 determines to present control panel 390 below the video content item 380.

Figure 4:
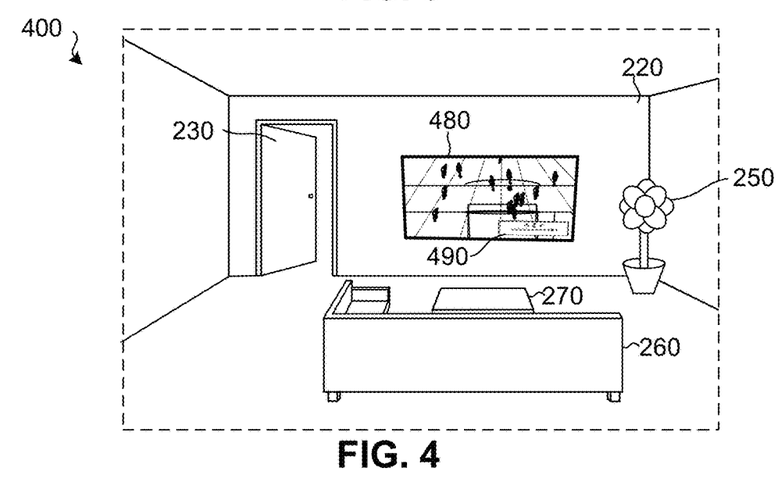
FIG. 4 is a view depicting the physical environment and a video content item using one or more context-based parameters in accordance with some implementations.

FIG. 4 is a view 400 depicting the physical environment 100 and a video content item 480 using one or more context-based parameters in accordance with some implementations. In this example, parameters defining the position, orientation, and other attributes of the video content item 480 and the other depictions 220, 230, 250, 260, 270 are determined based on context. The context may include the video content item having a high-definition (less than 4K) resolution, the user having selected a standard screen display mode, the user having an average/typical IPD, the video content item being intended for a home viewing environment (rather than a theater/cinema), the physical environment upon which the 3D environment is based having spatial dimensions that qualify it as a large room, the positions of potential viewing obstacles within the 3D environment, etc. In this example, based on such context attributes, the device 110 determines to position the video content item 480 six inches in front of wall 220 and three feet above the floor given the user's height and position. The video content item 480 is positioned and sized to block any depiction of window 140. The device 110 also determines to give the video content item 480 a size that will provide a comfortable and non-pixelated view given the high definition (less than 4K) resolution of the content and the viewer's position. It also determines to leave the brightness of the video content item 480 unchanged and the brightness of the other depictions 220, 230, 250, 260, 270 unchanged given the intended viewing environment matching the actual 3D environment depicted in the view. In addition, the device 110 determines to present control panel 490 overlapping a portion of the video content item 480.

Figure 5:
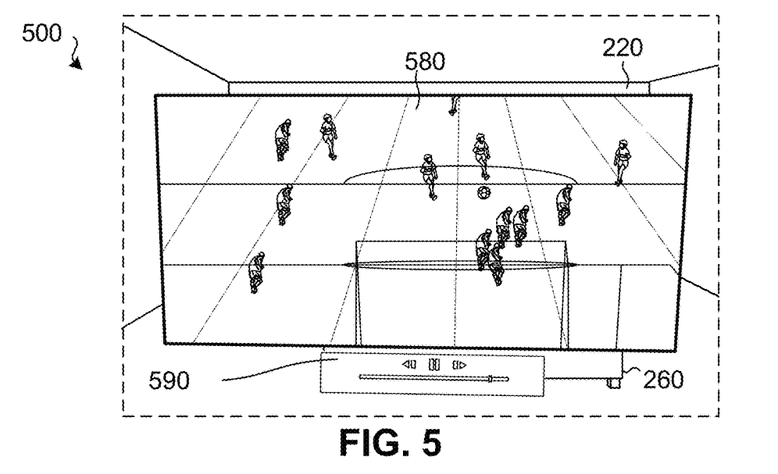
FIG. 5 is a view depicting the physical environment and a video content item using one or more context-based parameters in accordance with some implementations.

FIG. 5 is a view 500 depicting the physical environment 100 and a video content item 580 using one or more context-based parameters in accordance with some implementations. In this example, parameters defining the position, orientation, and other attributes of the video content item 580 and the other depictions 220, 260 are determined based on context. The context may include the video content item having a 4K resolution, the user having selected a full/cinema screen display mode, the user having an average/typical IPD, the video content item being intended for a home viewing environment (rather than a theater/cinema), the physical environment upon which the 3D environment is based having spatial dimensions that qualify it as a large room, the positions of potential viewing obstacles within the 3D environment, etc. In this example, based on such context attributes, the device 110 determines to position the video content item 580 directly in front of the user's view and occupying most (if not all) of the view 500. It also determines to give the video content item 580 a size that will provide an immersive view that takes full advantage of the device's display capabilities, consistent with the user's attributes and preferences. It also determines to leave the brightness of the video content item 580 unchanged and the brightness of the other depictions 220, 260 unchanged given the intended viewing environment matching the actual 3D environment depicted in the view. In various examples, content may be intended for dim, dark, bright or types of viewing environments and brightness of the content or surroundings can be adjusted accordingly. In addition, the device 110 determines to present control panel 590 below the video content item 580.

Figure 6A:
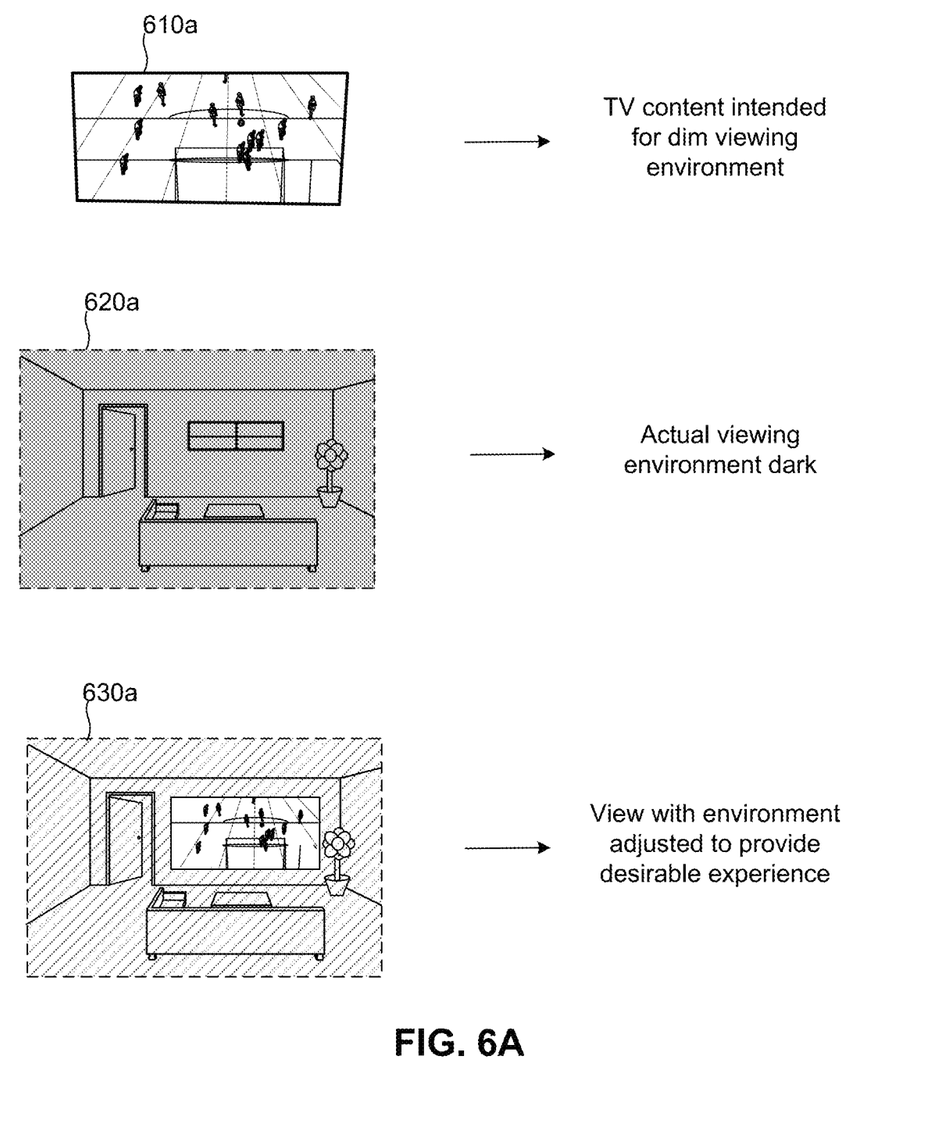
FIGS. 6A-C illustrate providing views of a physical environment and video content item based on intended viewing conditions of the video content item in accordance with some implementations.

FIG. 6A illustrates providing a view 630a of a 3D environment 620a and video content item 610a based on an intended viewing condition of the video content item 610a. In this example, video content item 610a is television content intended for a dim viewing environment (e.g., environments in which television content is typically viewed, such as household rooms with the room's lights providing dim lighting). The 3D environment 620a, however, is based on the user's actual physical environment, which is dark. For example, the physical environment 100 may have the lights turned completely off. In some implementations, the level of brightness of a 3D environment is determined based on sensors in the physical environment upon which the 3D environment is based. For example, an ambient light sensor may be used to determine a brightness level of the environment. In another example, images of the physical environment are evaluated (e.g., via an algorithm or machine learning model) to estimate a current level of brightness. Based on the 3D environment 620a being darker than the intended environment for the video content item 610*a*, the parameters used to provide the view 630*a* are determined. In this example, the depictions of the physical environment in the view 630*a* are made brighter—to provide the intended dim environment. In other examples, only portions of the environment (e.g., those portions that are proximate/within a few feet of the video content item 610*a* in the view 630*a*) are made brighter.

Figure 6B:
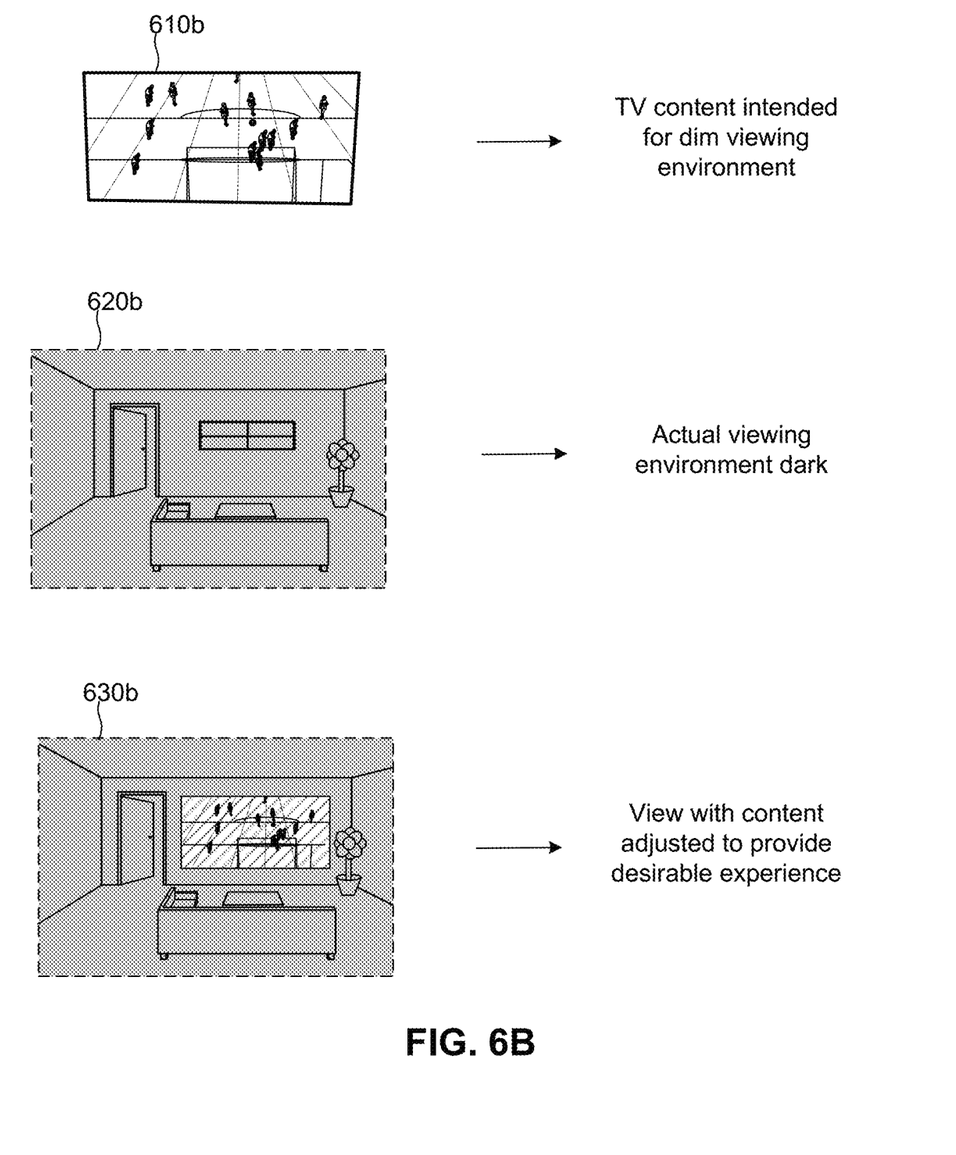

FIG. 6B illustrates providing a view 630*b* of a 3D environment 620*b* and video content item 610*b* based on an intended viewing condition of the video content item 610*b*. In this example, video content item 610*b* is television content intended for a dim viewing environment (e.g., environments in which television content is typically viewed, such as household rooms with the room's lights providing dim lighting). The 3D environment 620*b*, however, is based on the user's actual physical environment, which is dark. For example, the physical environment 100 may have the lights turned completely off. Based on the 3D environment 620*b* being darker than the intended environment for the video content item 610*b*, the parameters used to provide the view 630*b* are determined. In this example, the depictions TV content in the view 630*b* are made darker—to better match the actual dark viewing environment.

Figure 6C:
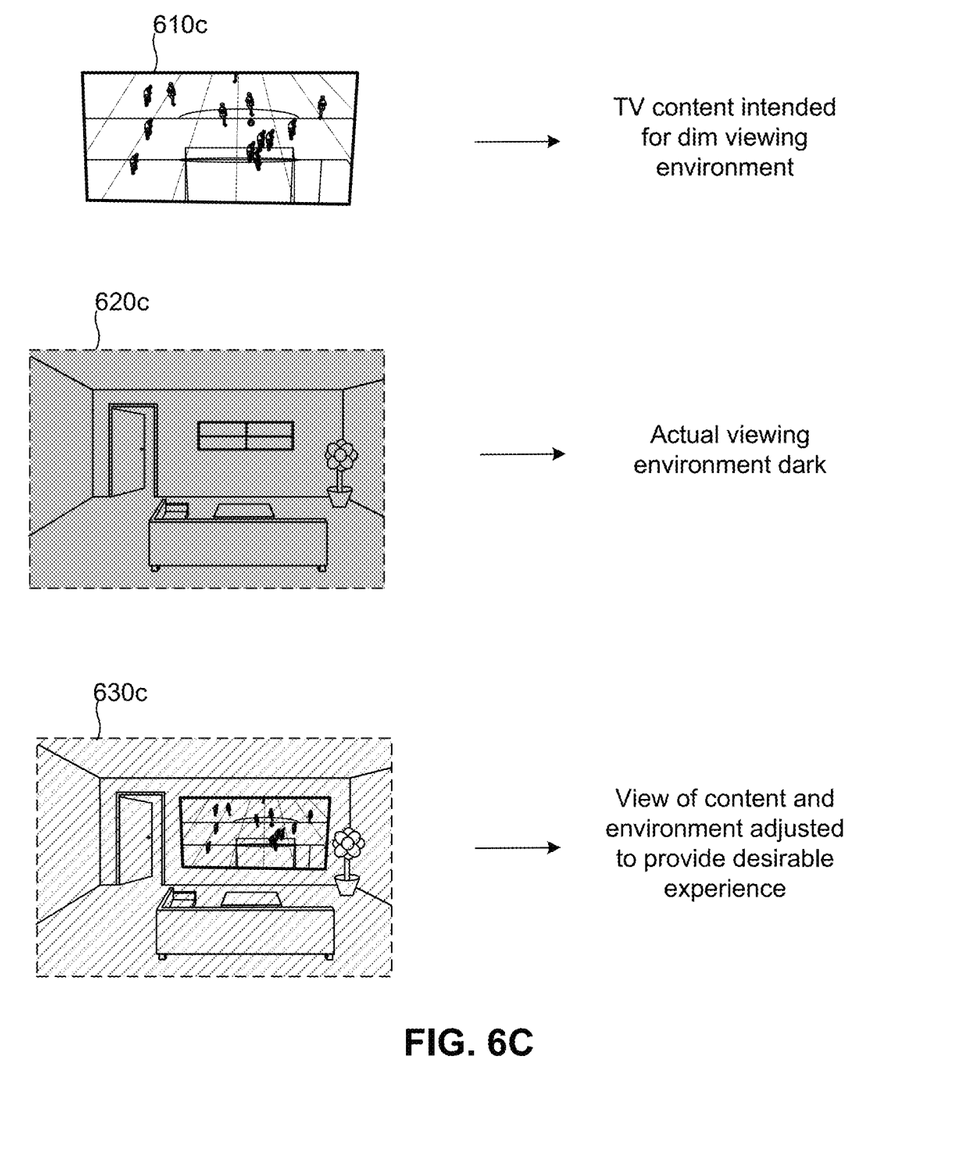

FIG. 6C illustrates providing a view 630*c* of a 3D environment 620*c* and video content item 610*c* based on an intended viewing condition of the video content item 610*c*. In this example, video content item 610*c* is television content intended for a dim viewing environment (e.g., environments in which television content is typically viewed, such as household rooms with the room's lights providing dim lighting). The 3D environment 620*c*, however, is based on the user's actual physical environment, which is dark. Based on the 3D environment 620*c* being darker than the intended environment for the video content item 610*c*, the parameters used to provide the view 630*c* are determined. In this example, the depictions of the physical environment in the view 630*c* are made brighter and the depictions TV content in the view 630*c* are made darker—to better match one another.

In some implementations, an intended viewing environment for content is determined based on content type. For example, traditional/TV content may be considered to be intended for dim viewing environments, cinematic content may be considered to be intended for dark viewing environments, and computer/user interface content, e.g., XR content, may be considered to be intended for bright viewing environments. Such content may be presented within views of 3D environments by altering the brightness of the content, the brightness of the surrounding environments, or both to provide a desirable or otherwise consistent user experience, e.g., a user experience in which the content is viewed in its intended viewing environment or matches with the brightness of the viewing environment in which it is experienced.

Figure 7:
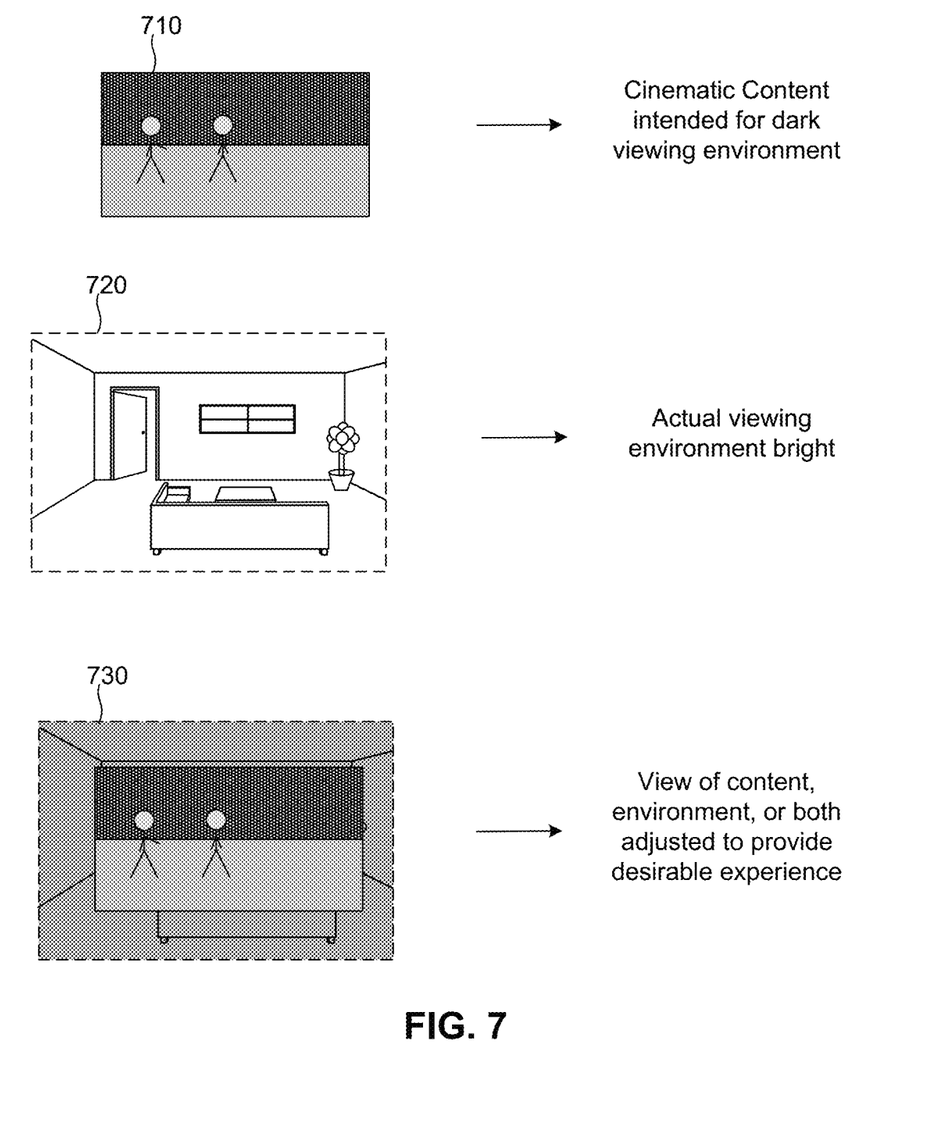
FIG. 7 illustrates providing a view of a physical environment and video content item based on an intended viewing condition of the video content item in accordance with some implementations.

FIG. 7 illustrates providing a view 730 of a 3D environment 720 and video content item 710 based on an intended viewing condition of the video content item 710 in accordance with some implementations. In this example, video content item 710 is movie theater content intended for a dark viewing environment (e.g., environments in which a movie theater is lit by minimal lighting other than the theater screen). The 3D environment 720, however, is a based on the user's actual physical environment, which is illuminated by natural lights from windows or the rooms lights. For example, the physical environment 100 may have the lights turned fully on and sunlight illuminating the room through a window. In some implementations, the level of brightness of a 3D environment is determined based on sensors in the physical environment upon which the 3D environment is based. For example, an ambient light sensor may be used to determine a brightness level of the environment. In another example, images of the physical environment are evaluated (e.g., via an algorithm or machine learning model) to estimate a current level of brightness. Based on the 3D environment 720 being brighter than the intended environment for the video content item 710, the parameters used to provide the view 730 are determined. In this example, the depictions of the physical environment in the view 730 are darkened and the video content item 710 is made slightly brighter. In other examples, only the non-video content item depictions are darkened (e.g., the video content item 710 is not altered). In other examples, only portions of the depictions (e.g., those proximate/within a few feet of the video content item 710 in the view 730) are darkened. In other examples, only the video content item 710 is made brighter, e.g., the depictions of the physical environment are not altered.

Figure 8:
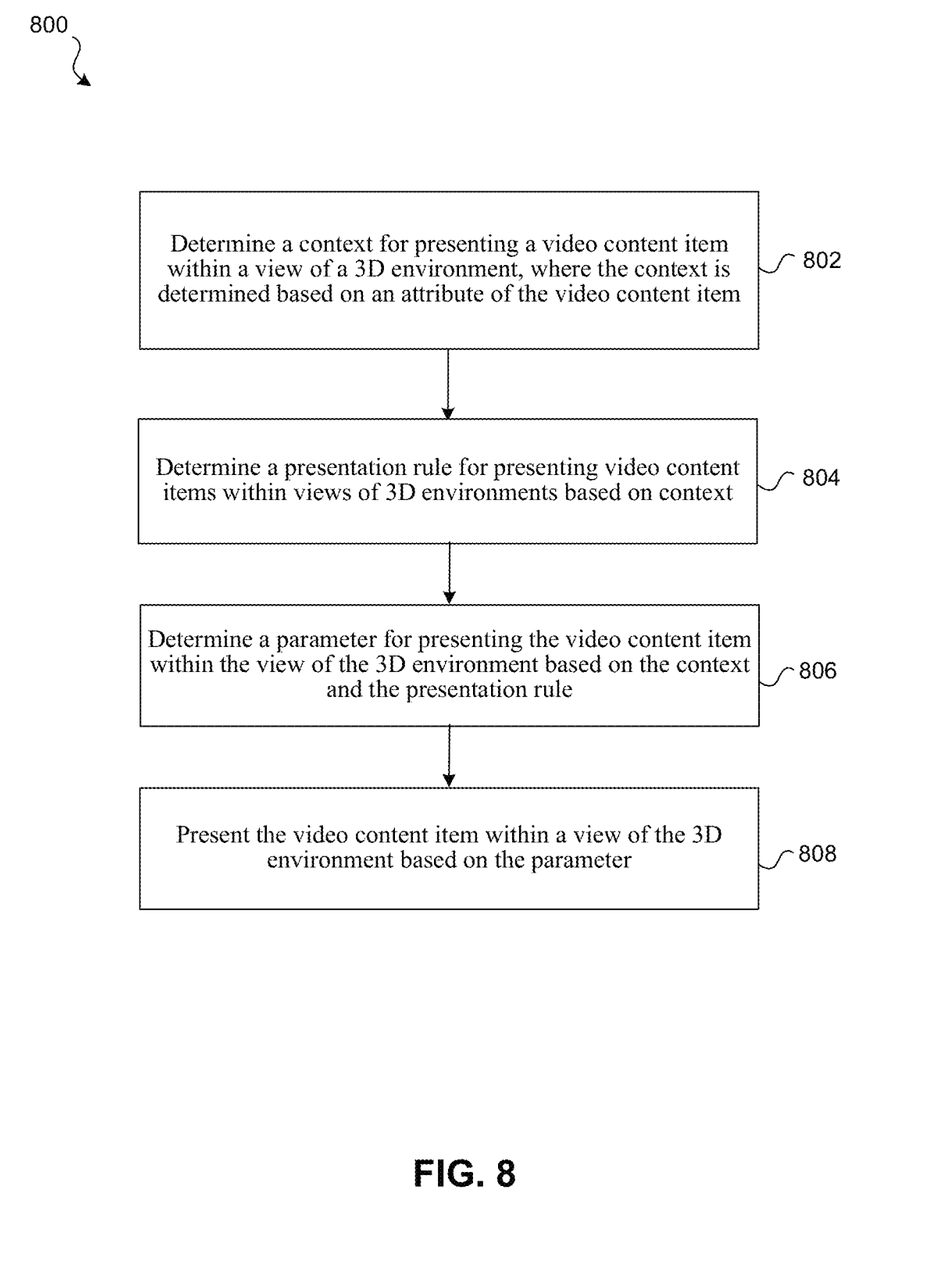
FIG. 8 illustrates a method providing a view of a physical environment and video content item using context-based parameters in accordance with some implementations.

FIG. 8 is a flowchart representation of an exemplary method 800 for providing a view of a physical environment and video content item using context-based parameters. In some implementations, the method 800 is performed by a device (e.g., device 110 of FIG. 1), such as a mobile device, desktop, laptop, or server device. The method 800 can be performed on a device that has a screen for displaying images and/or a screen for viewing stereoscopic images such as a head-mounted display (HMD). In some implementations, the method 800 is performed by processing logic, including hardware, firmware, software, or a combination thereof. In some implementations, the method 800 is performed by a processor executing code stored in a non-transitory computer-readable medium (e.g., a memory).

At block 802, the method 800 determines a context for presenting a video content item within a view of a 3D environment, where the context is determined based on an attribute of the video content item. The context may be determined based on analyzing the video content item. In one example, the context is determined based on metadata associated (e.g., stored with or otherwise) with the video content item.

The context may be determined by processing the video content item using an algorithm or machine learning model configured to classify the video content item, e.g., as having a content type, as having a brightness classification, as having an intended viewing environment classification, as having a color scheme/range classification, etc.

The context may identify or be based upon a content item type or an intended viewing environment for the content item.

The context may be based on the viewer and thus may identify one or more viewer attributes. For example, the context may identify a viewer intent regarding viewing the video content item (e.g., which viewing mode the user has selected via input). As another example, the context may identify that the viewer typically likes to be a particular distance away from (e.g., 7-10 feet) video content or video content of a particular type (e.g., sports, movies, concerts, movie theater movies, etc.). As another example, the context may identify that the viewer has a particular interpupillary distance (IPD) or other physiological features or state. For example, the context may identify a user's current activity, e.g., working on something else versus intently watching video content items, etc.

The context may identify an environmental attribute of the 3D environment, e.g., the types of objects in the surroundings, the size of the room, the shape of the room, the acoustical characteristics of the room, the identities of/or number of other people in the room, the furniture in the room where the viewer is expected to sit to view the video content item, the ambient lighting in the room, etc. The context may be based on object detection or scene understanding of the 3D environment or the physical environment upon which it is based. For example, an object detection module can analyze RGB images from a light intensity camera and/or a sparse depth map from a depth camera (e.g., time-of-flight sensor) and other sources of physical environment information (e.g., camera positioning information from a camera's SLAM system, VIO, or the like such as position sensors) to identify objects (e.g., people, pets, furniture, walls, floors, etc.) in the sequence of light intensity images. In some implementations, an object detection module uses machine learning for object identification. In some implementations, the machine learning model is a neural network (e.g., an artificial neural network), decision tree, support vector machine, Bayesian network, or the like. For example, the object detection module may use an object detection neural network unit to identify objects and/or an object classification neural network to classify each type of object.

The context may identify an automatically or manually selected viewing mode, e.g., full screen/cinematic, 2D, 3D, custom, etc. The context may identify a user-specific change of viewing mode or video content scale. In some implementations, a user selection of a viewing mode triggers determination or redetermination of parameters for displaying the content in the newly-selected viewing mode.

At block 804, the method 800 determines a presentation rule for presenting video content items within views of 3D environments based on the context. Such rules may specify that, given a particular context, one or more specific parameters are to be used to present a video content item or depictions of other objects in the 3D environment. In one example, the presentation rule positions a virtual 2D screen for video content to optimize viewing angle, maximize display screen occupancy (e.g., avoid wasting pixels of the physical display on non-video content), ensure user comfort, or avoid exceeding visible video display resolution limits. In one example, the presentation rule positions a virtual 2D screen for the video content based on physiological data of a viewer (e.g., viewer IPD). In one example, the presentation rule positions 3D video content for optimal binocular stereo viewing.

The presentation rule may adjust brightness or the brightness may be used to adjust a presentation rule. In one example, the presentation rule adjusts brightness of video content by mapping/matching content brightness with environment brightness. In one example, the presentation rule adjusts brightness by dimming or darkening a passthrough environment. In one example, the presentation rule adjusts brightness of video content or environment content based on a type of video content (e.g., theater/cinema or TV). In one example, the presentation rule adjusts brightness of video content over time to change viewer light perception (e.g., reduce brightness for limited time so that the normal image will appear to be brighter than it actually is at certain times during the playing of the video content to align with brightness requirements of the video content item).

The presentation rule may adjust color range based on content type, e.g., determining color based on media and choosing a color range based on the content or system specifics. The presentation rule may adjust color range based on a viewer, e.g., using HDR if the user is gazing at/intently watching the content and otherwise using a non-HDR format.

The presentation rule may adjust a color space based on context. For example, a color space may be selected based on the video content or the environment. In one example, a color space used to display content is based on one or more colors in the environment, e.g., in other user interface content (if any) that is being displayed simultaneously with the video content or otherwise present in the visible portions of the environment. In one example, a color space is selected to correspond to a content creator's intent for the video content taking into account other colors in the viewing environment. In one example, if the user is only looking at video content and no other user interface content is present, a content reference color is used to adjust the video content to match the creator's intent. On the other hand, if other user interface elements are displayed, the content reference color may not be used in order to make the video blend better with the overall environment.

The presentation rule may adjust a frame rate based on video content and viewing mode. For example, this may involve changing device display frame rate to match content frame rate while in cinema/full screen mode.

Similarly, the presentation rule may adjust resolution of a display of the electronic device based on standard viewer faculties and viewer 3D position.

The presentation rule may adjust audio spatiality, for example, based on context or viewing mode. In one example, a number and position of audio sources is determined based on the context. Such audio parameters may be determined to match the selected screen size or viewing mode. For example, the relatively smaller screen size of FIG. 4 may have one or more audio sources positioned behind the screen while the relatively larger screen size of FIG. 3 may be used with multiple-channel audio sources positioned around the viewer. A full screen/cinema viewing experience may provide maximum spatialization of sound within the capabilities of the device and taking into account the 3D environment. In a small room, spatialization of audio may be limited to avoid providing an unrealistic experience while ensuring that at least a minimum quality of audio is provided, e.g., even if the user is in a small closet-sized room the audio may have acoustical properties consistent with at least a medium sized room to avoid providing an undesirable listening experience. In some implementations, a level of immersion of video and a number of spatialized sources and their locations is determined based on context to provide a realistic yet optimal user experience.

At block 806, the method 800 determines a parameter (e.g., 3D positioning, audio mode, brightness, color format, etc.) for presenting the video content item within the view of the 3D environment based on the context and the presentation rule, and, at block 808, the method 800 presents the video content item within a view of the 3D environment based on the parameter.

Presenting the view may involve presenting a representation of a physical environment using content from a sensor (e.g., an image sensor, a depth sensor, etc.) located in the physical environment. For example, an outward facing camera (e.g., a light intensity camera) captures passthrough video of a physical environment. Thus, if a user wearing an HMD is sitting in his or her living room, the representation could be pass through video of the living room being shown on the HMD display.

In some implementations, the method 800 determines a viewpoint for presenting the video content within the view of the 3D environment based on the context and the presentation rule. This may involve intentionally changing a user's perceptual understanding to improve the user's perception of the content or otherwise improve the user's experience.

In some implementations, a microphone (one of the I/O devices and sensors of device 110) may capture sounds in the physical environment and could include sound the experience.

The view may include a virtual 2D screen or virtual 3D content viewing area positioned within a surrounding 3D environment. The video content item may be presented to appear to be on such a 2D screen or within such a 3D content viewing area. In one example, a user may be wearing an HMD and viewing the real-world physical environment (e.g., in the kitchen as the presented representation of the physical environment) via pass through video (or optical-see-through video), and a virtual screen may be generated for the user to watch the video content item.

Figure 9:
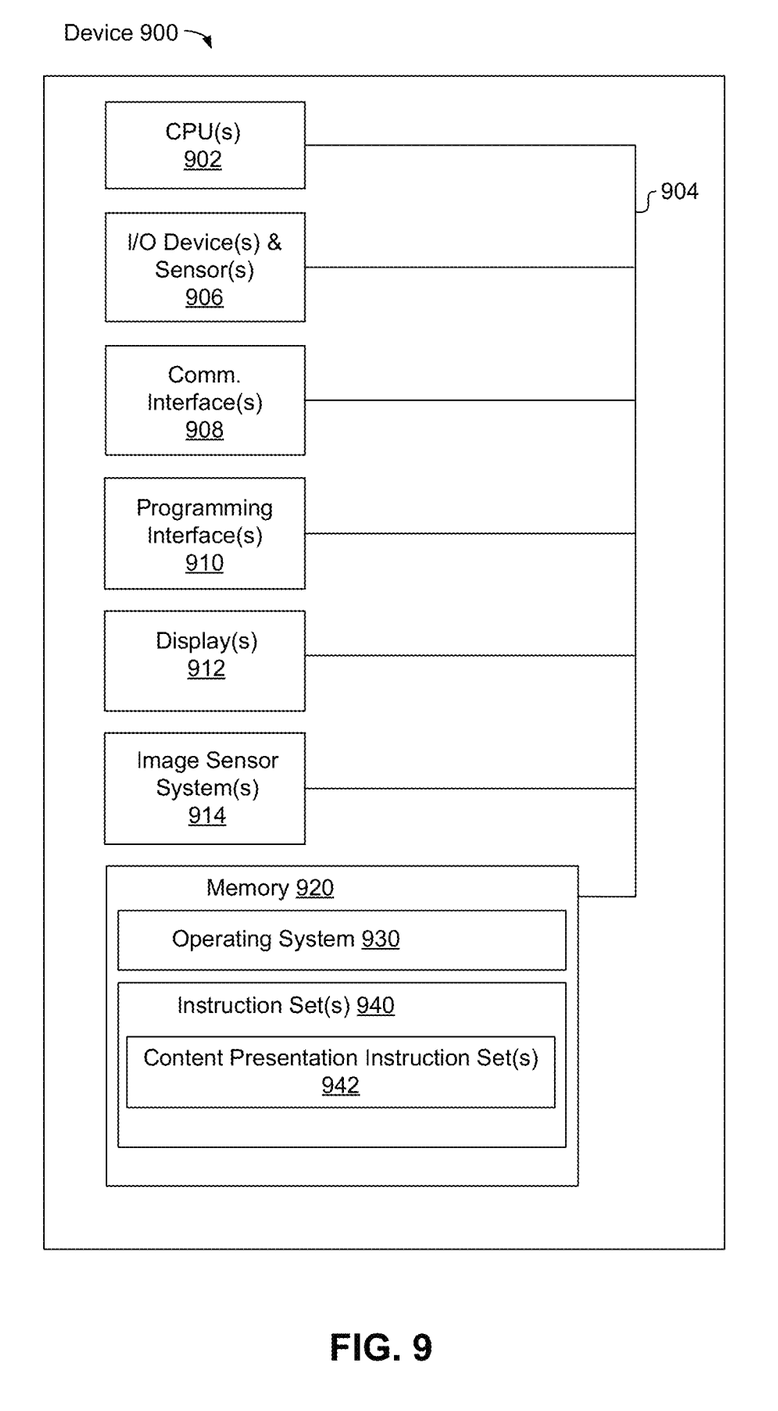
FIG. 9 illustrates an exemplary device configuration in accordance with some implementations.

FIG. 9 is a block diagram of an example of the device 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 110 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 910, one or more AR/VR displays 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, an ambient light sensor (ALS), one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 912 are configured to present the experience to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 912 correspond to diffractive, reflective, polarized, holographic, etc. waveguide displays. For example, the device 110 includes a single display. In another example, the device 110 includes a display for each eye of the user.

In some implementations, the one or more image sensor systems 914 are configured to obtain image data that corresponds to at least a portion of the physical environment 105. For example, the one or more image sensor systems 914 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data including at least a portion of the processes and techniques described herein.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium. In some implementations, the memory 920 or the non-transitory computer readable storage medium of the memory 920 stores the following programs, modules and data structures, or a subset thereof including an optional operating system 930 and one or more instruction set(s) 940.

The operating system 930 includes procedures for handling various basic system services and for performing hardware dependent tasks. In some implementations, the instruction set(s) 940 are configured to manage and coordinate one or more experiences for one or more users (e.g., a single experience for one or more users, or multiple experiences for respective groups of one or more users).

The instruction set(s) 940 include a content presentation instruction set 942 configured with instructions executable by a processor to provide content on a display of an electronic device (e.g., device 110). For example, the content may include an XR environment that includes depictions of a physical environment including real objects and virtual objects (e.g., a virtual screen overlaid on images of the real-world physical environment). The content presentation instruction set 942 is further configured with instructions executable by a processor to obtain image data (e.g., light intensity data, depth data, etc.), generate virtual data (e.g., a virtual movie screen) and integrate (e.g., fuse) the image data and virtual data (e.g., mixed reality (MR)) using one or more of the techniques disclosed herein. The content presentation instruction set 942 may determine a context (e.g., one or more contextual factors/attributes) and apply one or more presentation rules based on the context to determine parameters used to present video content items within depictions of 3D environments, as described herein.

Although these elements are shown as residing on a single device (e.g., the device 110), it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., instruction set(s) 940) shown separately in FIG. 9 could be implemented in a single module and the various functions of single functional blocks (e.g., instruction sets) could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   at an electronic device having a processor:
   determining a context for presenting a video content item within a view of a three-dimensional (3D) environment, wherein the context is determined based on an attribute of the video content item;
   determining a presentation rule for presenting video content items within views of 3D environments based on the context;
   determining a parameter for presenting the video content item within the view of the 3D environment based on the context and the presentation rule; and
   presenting a view of the 3D environment, the view comprising the video content item presented based on the parameter.

2. The method of claim 1, wherein the context is determined based on analyzing the video content item.

3. The method of claim 1, wherein the context is determined based on metadata associated with the video content item.

4. The method of claim 1, wherein the context comprises a content item type or an intended viewing environment for the content item.

5. The method of claim 1, wherein the context comprises a viewer attribute.

6. The method of claim 1, wherein the context comprises an environmental attribute of the 3D environment.

7. The method of claim 1, wherein the context comprises a viewing mode.

8. The method of claim 1, wherein the context comprises a user-specific change of viewing mode or video content scale.

9. The method of claim 1, wherein the presentation rule positions a virtual 2D screen for video content to prioritize viewing angle, screen occupancy, or user comfort, or avoid visible video display resolution limits.

10. The method of claim 1, wherein the presentation rule positions a virtual 2D screen for the video content based on physiological data of a viewer.

11. The method of claim 1, wherein the presentation rule positions 3D movie content based on binocular stereo viewing.

12. The method of claim 1, wherein the presentation rule:
    adjusts brightness of video content brightness by mapping content brightness with environment brightness;
    adjusts brightness by dimming or darkening a pass-through environment;
    adjusts brightness of video content or environment content based on a type of video content; or
    adjusts brightness of video content over time to change viewer light perception.

13. The method of claim 1, wherein the presentation rule:
    adjusts color range based on content type; or
    adjusts color range based on a viewer.

14. The method of claim 1, wherein the presentation rule adjusts a frame rate based on video content and viewing mode.

15. The method of claim 1, wherein the presentation rule adjusts resolution of a display of the electronic device based on standard viewer faculties and viewer 3D position.

16. The method of claim 1, wherein the presentation rule adjusts audio spatiality based on viewing mode.

17. The method of claim 1, wherein the presentation rule adjusts audio spatiality based on viewing mode.

18. The method of claim 1, wherein the electronic device is a head-mounted device.

19. The method of claim 1, wherein the 3D environment is an extended reality (XR) environment.

20. The method of claim 1, wherein the 3D environment comprises a virtual screen positioned at a location relative to depictions of portions of a physical environment.

21. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:

determining a context for presenting a video content item within a view of a three-dimensional (3D) environment, wherein the context is determined based on an attribute of the video content item;

determining a presentation rule for presenting video content items within views of 3D environments based on the context;

determining a parameter for presenting the video content item within the view of the 3D environment based on the context and the presentation rule; and presenting a view of the 3D environment, the view comprising the video content item presented based on the parameter.

22. The system of claim 21, wherein the context is determined based on analyzing the video content item.

23. The system of claim 21, wherein the context is determined based on metadata associated with the video content item.

24. The system of claim 21, wherein the context comprises a content item type or an intended viewing environment for the content item.

25. A non-transitory computer-readable storage medium, storing program instructions executable by one or more processors to perform operations comprising:

determining a context for presenting a video content item within a view of a three-dimensional (3D) environment, wherein the context is determined based on an attribute of the video content item;

determining a presentation rule for presenting video content items within views of 3D environments based on the context;

determining a parameter for presenting the video content item within the view of the 3D environment based on the context and the presentation rule; and presenting a view of the 3D environment, the view comprising the video content item presented based on the parameter.

* * * * *